(12) United States Patent
Pashcow

(10) Patent No.: US 8,689,994 B2
(45) Date of Patent: Apr. 8, 2014

(54) SAFETY DEVICE FOR A FLUID STORAGE TANK, RELATED SYSTEMS AND METHODS

(76) Inventor: Milton Pashcow, Massapequa Park, NY (US)

( * ) Notice: Subject to any disclaimer, the term of this patent is extended or adjusted under 35 U.S.C. 154(b) by 13 days.

(21) Appl. No.: 13/327,982

(22) Filed: Dec. 16, 2011

(65) Prior Publication Data
US 2013/0153579 A1    Jun. 20, 2013

(51) Int. Cl.
*B65D 51/16*    (2006.01)

(52) U.S. Cl.
USPC ............ 220/203.19; 220/203.29; 220/203.01; 116/109

(58) Field of Classification Search
USPC ................ 220/89.1, 203.03, 203.01, 203.19, 220/203.2, 203.29; 116/109, 110, 112
See application file for complete search history.

(56) References Cited

U.S. PATENT DOCUMENTS

| | | | | |
|---|---|---|---|---|
| 1,311,528 A | * | 7/1919 | Muir | 123/41.21 |
| 1,724,878 A | * | 8/1929 | Jensen | 137/43 |
| 2,143,476 A | * | 1/1939 | Crossley | 137/558 |
| 2,143,492 A | * | 1/1939 | Morse | 137/558 |
| 2,143,706 A | * | 1/1939 | Mathey | 137/558 |
| 2,152,459 A | * | 3/1939 | Biasco | 116/109 |
| 2,212,620 A | * | 8/1940 | Scully et al. | 137/558 |
| 2,227,323 A | * | 12/1940 | Mathey et al. | 137/558 |
| 2,249,180 A | * | 7/1941 | Scully et al. | 137/558 |
| 2,288,984 A | * | 7/1942 | Willits | 429/91 |
| 2,403,691 A | * | 7/1946 | States | 99/279 |
| 2,502,525 A | * | 4/1950 | Krugler | 62/50.7 |
| 2,531,950 A | * | 11/1950 | Scully | 137/558 |
| 2,703,194 A | * | 3/1955 | White | 141/96 |
| 2,716,389 A | * | 8/1955 | Mathey | 116/109 |
| 2,751,877 A | * | 6/1956 | Boone et al. | 116/109 |
| 2,759,489 A | * | 8/1956 | Schutter | 137/558 |
| 2,847,025 A | * | 8/1958 | Reitman | 137/426 |
| 2,905,137 A | | 9/1959 | Milnes | |
| 2,910,956 A | * | 11/1959 | Scully | 116/109 |
| 3,391,818 A | * | 7/1968 | Hairston | 220/202 |
| 3,620,240 A | | 11/1971 | Bogdanski | |
| 4,023,583 A | | 5/1977 | Parkinson | |
| 4,640,304 A | * | 2/1987 | Looney | 137/202 |
| 4,856,564 A | * | 8/1989 | Obal | 141/95 |
| 4,997,013 A | * | 3/1991 | Peckels | 141/95 |
| 5,007,450 A | * | 4/1991 | Babb et al. | 137/315.08 |
| 5,236,100 A | * | 8/1993 | Shin | 220/89.1 |
| 5,449,029 A | * | 9/1995 | Harris | 141/198 |
| 5,816,430 A | * | 10/1998 | Gruber | 220/367.1 |
| 5,829,491 A | * | 11/1998 | Bennett | 141/59 |
| 5,832,968 A | * | 11/1998 | Leary | 141/94 |
| 5,975,154 A | * | 11/1999 | Bennett | 141/59 |
| 6,000,359 A | * | 12/1999 | Hudson et al. | 116/109 |
| 6,138,852 A | * | 10/2000 | Miura et al. | 220/86.2 |
| 6,672,244 B1 | * | 1/2004 | Martin | 116/109 |

(Continued)

*Primary Examiner* — Anthony Stashick
*Assistant Examiner* — Christopher McKinley
(74) *Attorney, Agent, or Firm* — Dilworth & Barrese, LLP.; Michael J. Musella

(57) ABSTRACT

A safety device for a fluid storage tank having a first port for filling the tank with fuel oil and a second port for allowing airflow therethrough is disclosed. The safety device includes a tubular body having a first open end and a second open end connectable to the second port, and a flow check valve contained within the tubular body and configured to remain open when air flows through the safety device and configured to close based on a predetermined fluid force of the fuel oil through the safety device. Related systems and methods are also disclosed.

15 Claims, 7 Drawing Sheets

(56) References Cited

U.S. PATENT DOCUMENTS

| | | | |
|---|---|---|---|
| 6,725,800 B2* | 4/2004 | Hawkins | 116/109 |
| 7,108,147 B2* | 9/2006 | Cheung | 220/203.29 |
| 7,152,638 B2 | 12/2006 | Ganachaud | |
| 7,497,185 B2* | 3/2009 | Gudjohnsen et al. | 116/109 |
| 2011/0186571 A1 | 8/2011 | Burkholder | |

* cited by examiner

SAFETY DEVICE FOR A FLUID STORAGE TANK, RELATED SYSTEMS AND METHODS

TECHNICAL FIELD

The present disclosure generally relates to fluid storage tanks, systems and methods employed during the filling of a fluid storage tank, and more particularly, to a device that is configured to prevent spillage of a fluid during the filling of the storage tank.

BACKGROUND

Storage tanks for holding a variety of fluids are known. Often these storage tanks are used to store environmentally hazardous fluids such as fuel oil or gasoline. These storage tanks are often equipped with venting systems to allow for air flow out of the tank during filling operations or to allow for air flow into the tank during fuel consumption in order to maintain air pressure balance between the air pressure in and out of the tank. These venting systems often consist of a simple opening on the top of the storage tank, which may connect to a vent pipe that extends to the outside atmosphere when the storage tank is located within an enclosed structure. During the filling operations and when an overfill of the tank occurs, the fluid will be forced through the venting system and outside the tank, thus creating an environmental hazardous spill condition.

Storage tanks for storing environmentally hazardous fluids are often equipped with fill alarms that alert pump truck operators when a fluid level in a tank reaches an upper limit during the filling operation. One type of fill alarm is a whistle fill alarm that produces a whistling sound during the fill operation by allowing air to be forced through an orifice in the fill alarm. When the fluid enters into the whistle, the whistling stops, alerting the operator to cease the filling operation. As in systems without fill alarms, the filling process often continues passed the upper limit of the tank and a spillage of the environmentally hazardous fluid can occur through the orifice in the whistle fill alarm.

The present invention solves at least these problems occurring in the prior art.

SUMMARY OF THE INVENTION

Accordingly, systems and methods are provided to prevent fluid spillage during storage tank filling operations. It is contemplated that the oil tank safety device is configured to prevent fluid from flowing through a venting system of the storage tank.

In one particular embodiment, in accordance with the principles of the present disclosure, a safety device for a fuel oil storage tank having a first port for filling the tank with fuel oil and a second port for allowing airflow therethrough is provided. The safety device includes a tubular body having a first open end and a second open end connectable to the second port, and a flow check valve contained within the tubular body and configured to remain open when air flows through the safety device and configured to close based on a predetermined fluid force of the fuel oil through the safety device.

In one embodiment, in accordance with the principles of the present disclosure, an oil tank safety system is provided. The safety system includes a storage tank configured to store a fluid having a first port used to fill the tank with the fluid and a second port used as an air vent, and a safety device connected at the second port configured to permit air to vent and configured to prevent the fluid from flowing through the second port.

In one embodiment, in accordance with the principles of the present disclosure, a method for preventing fluid spillage from a storage tank having a first port for filling the tank with fluid and a second port for allowing airflow therethrough is provided. The method for preventing fluid spillage includes providing a fill alarm, attaching the fill alarm to the second port, providing a flow check valve, and attaching the flow check valve to the fill alarm.

BRIEF DESCRIPTION OF THE DRAWINGS

The present disclosure will become more readily apparent from the specific description accompanied by the following drawings, in which.

Like reference numerals indicate similar parts throughout the figures.

DETAILED DESCRIPTION OF THE INVENTION

Figure 1:
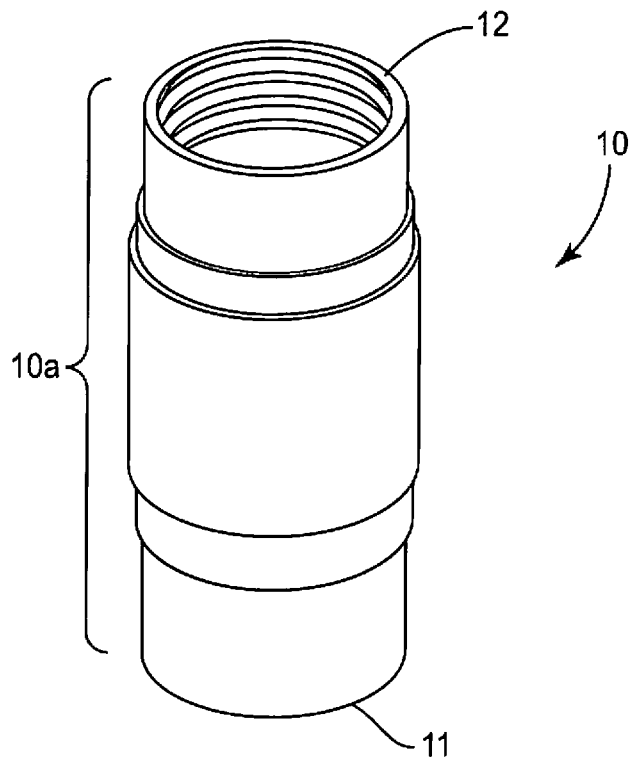
FIG. 1 is a perspective view of one particular embodiment of a safety device in accordance with the principles of the present disclosure.
Figure 2:
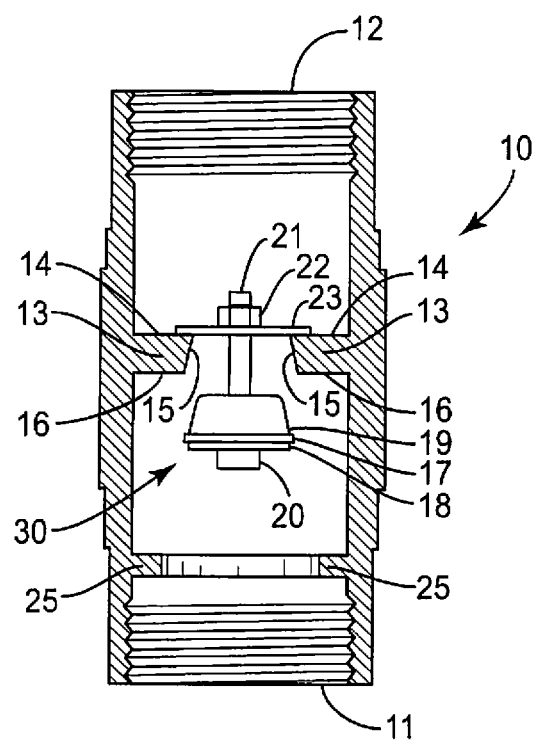
FIG. 2 is a cross sectional view of the safety device illustrated in FIG. 1.
Figure 3:
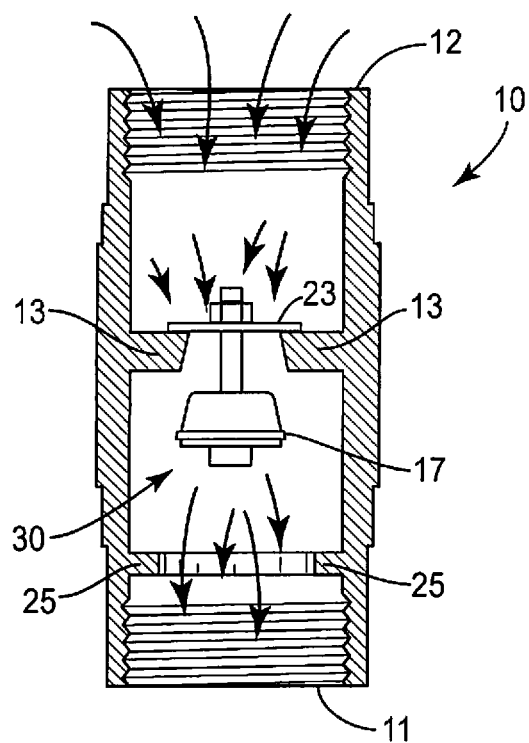
FIG. 3 is a cross sectional view of the safety device illustrated in FIG. 1 during a consumption operation.
Figure 4:
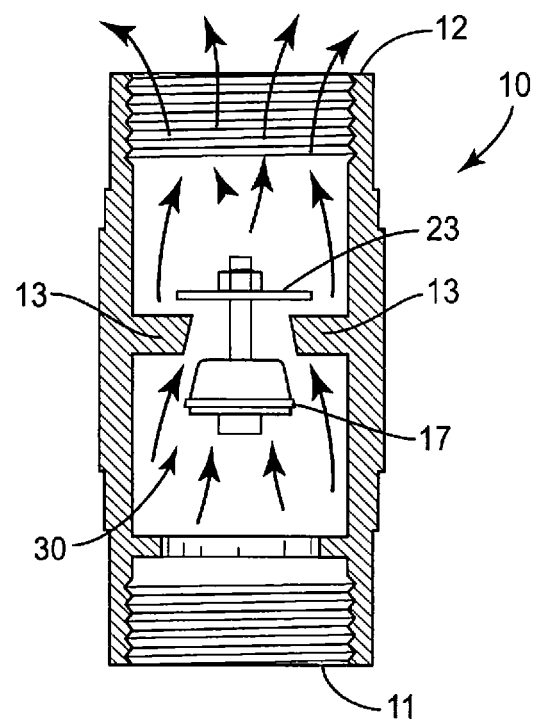
FIG. 4 is a cross sectional view of the safety device illustrated in FIG. 1 during a filling operation.
Figure 5:
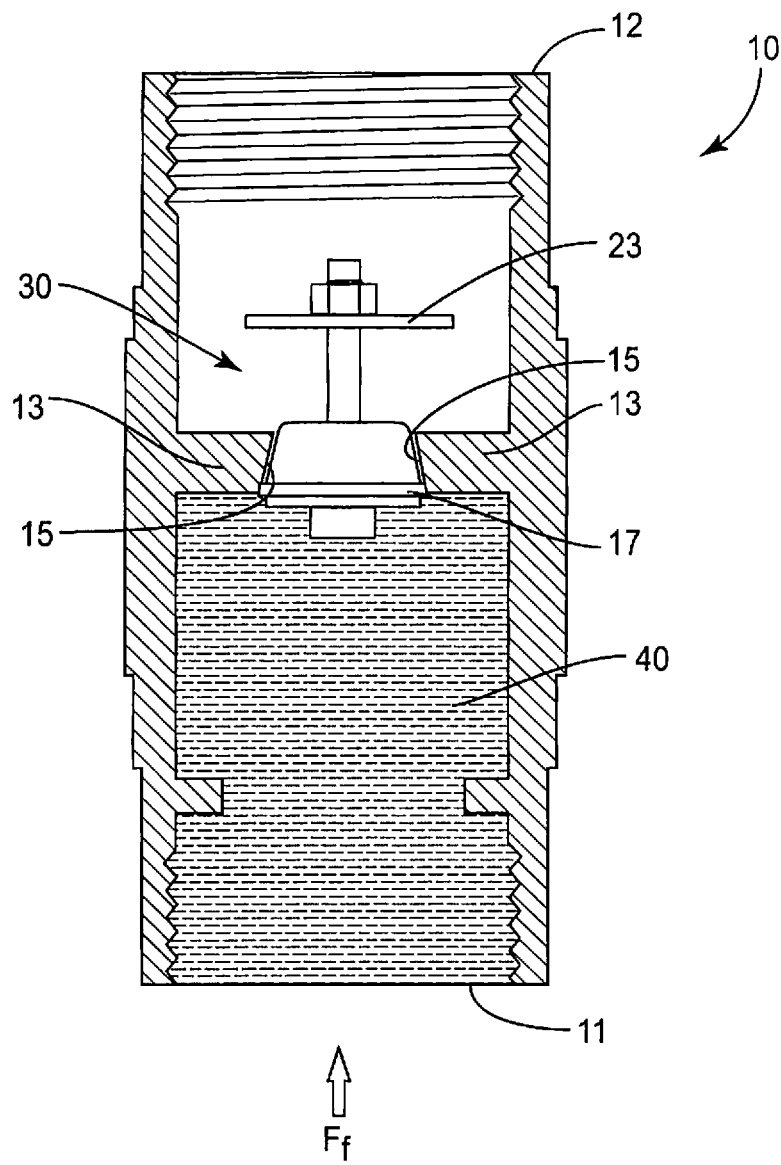
FIG. 5 is a cross sectional view of the safety device illustrated in FIG. 1 at a fluid shut off state.
Figure 6:
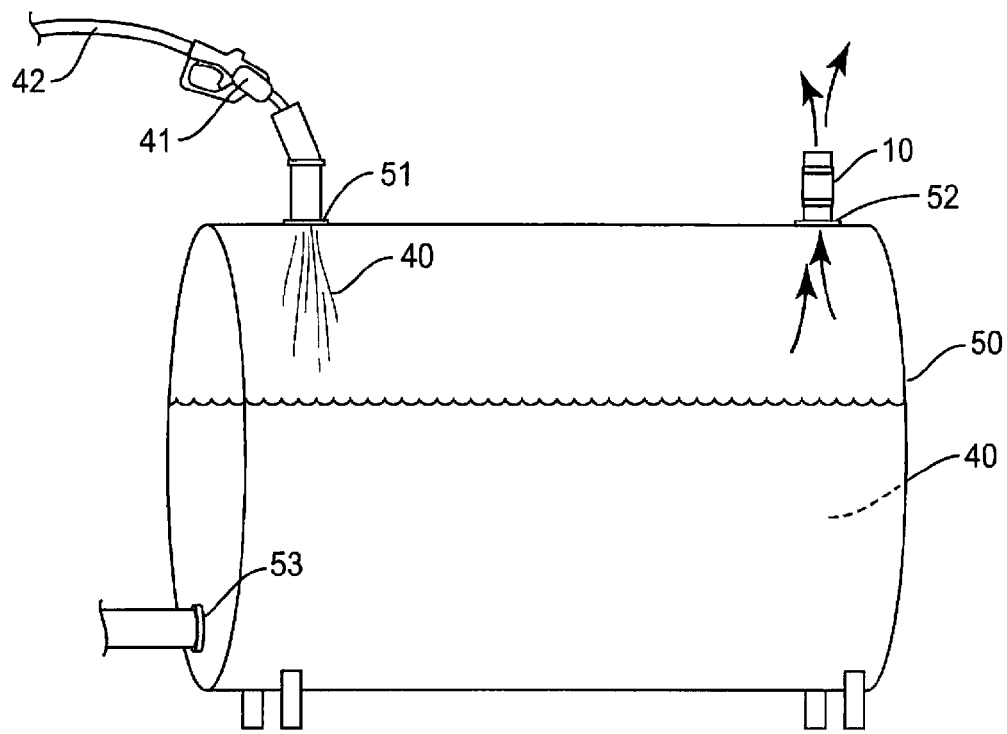
FIG. 6 a partial cross sectional perspective view of one particular embodiment of a safety device system in accordance with the principles of the present disclosure.
Figure 7:
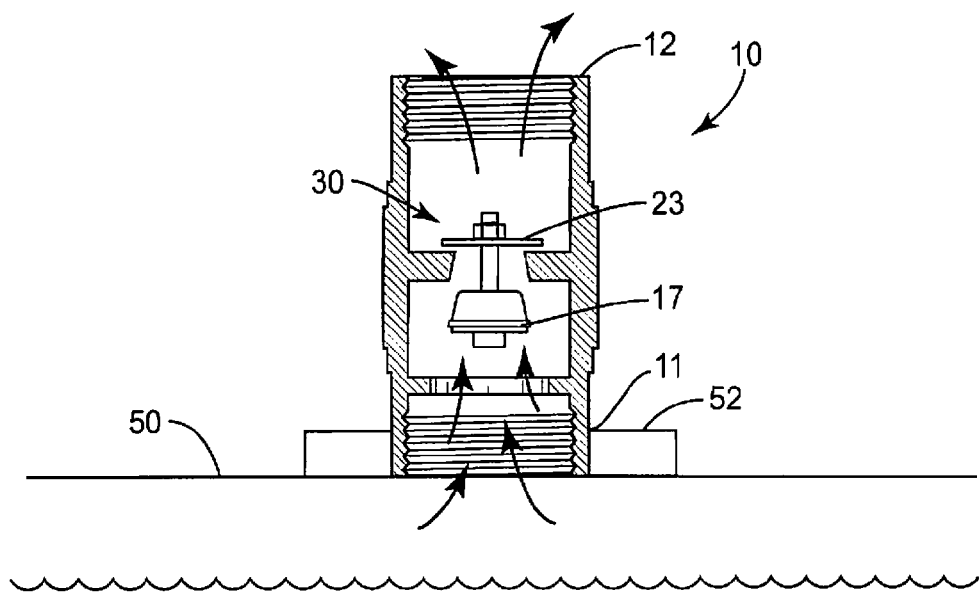
FIG. 7 is a partial exploded cross sectional view of the safety device system illustrated in FIG. 6 during a filling operation.
Figure 8:
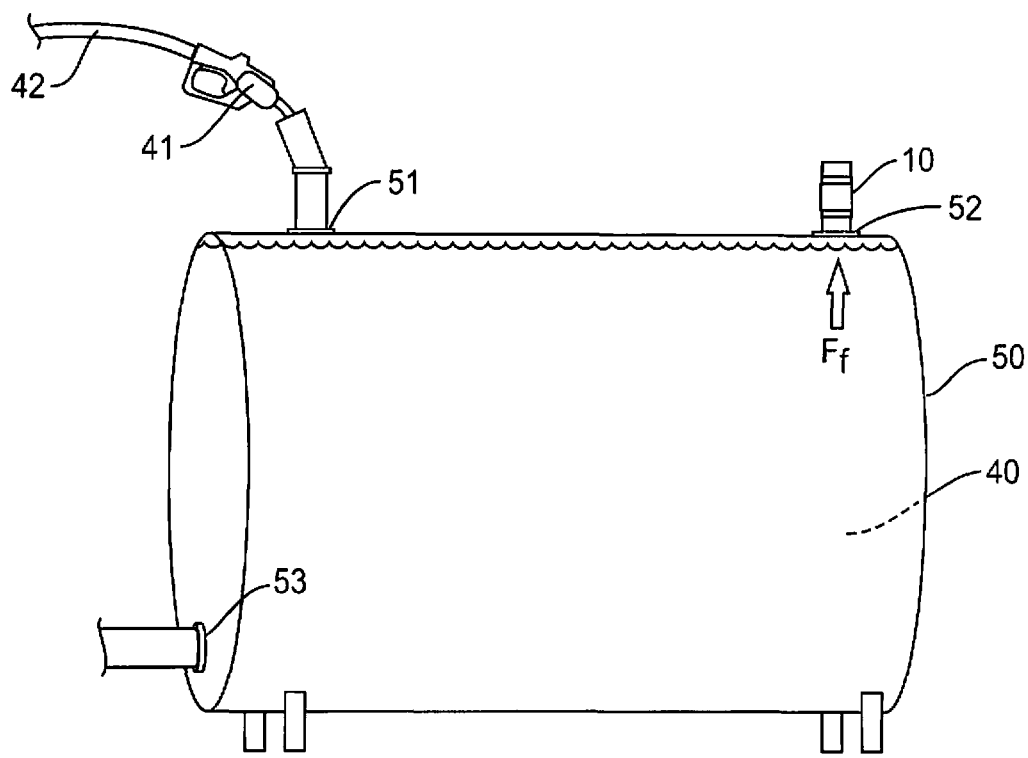
FIG. 8 is a partial cross sectional view of the safety device system illustrated in FIG. 6 at a fluid shut off state.
Figure 9:
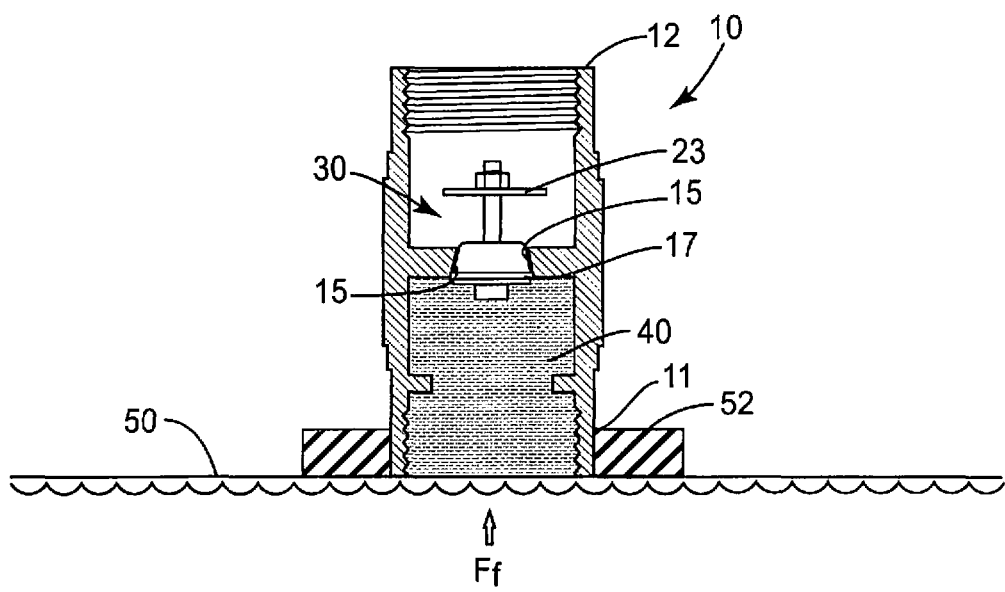
FIG. 9 is a partial exploded cross sectional view of the safety device system illustrated in FIG. 8 at a fluid shut off state.

The exemplary embodiments of the oil tank safety device, related systems and methods of use disclosed are discussed in terms of fuel oil and fuel oil storage tanks employed to store the fuel oil for later consumption. It is envisioned that the oil tank safety device, systems and methods of use disclosed prevent spillage of environmentally hazardous fluids.

It is envisioned that the present disclosure may be employed to prevent spillage of fluid that is stored in a refillable storage tank having an air vent. It is contemplated that the present invention may apply to non-environmentally hazardous fluids as well as environmentally hazardous fluids. It is also contemplated that the present invention may apply to storage tanks that are outside, enclosed in a storage facility or buried.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure.

The following discussion includes a description of a safety device for a fluid storage tank, related components and exemplary methods of employing safety device in accordance with the principles of the present disclosure. Alternate embodiments are also disclosed. Reference will now be made in detail to the exemplary embodiments of the present disclosure, which are illustrated in the accompanying figures. Turning now to FIGS. 1-9, there is illustrated components of a safety device 10 in accordance with the principles of the present disclosure.

Safety device 10 has a body 10a having a first end 11 and a second end 12. Body 10a includes a ring shaped stop 13 that extends inward and along an inside circumference of body 10a. Stop 13 defines a centrally located hole therein. Stop 13 includes an upper surface 14, a seat 15 and a lower surface 16. Seat 15 angles down and outward from an inner edge of upper surface 14. Body 10a can include male or female threads at ends 11, 12 to facilitate connection between safety device 10 and other components. Other means for connection are contemplated, for example, compression fittings, clamps, or adhesive fittings.

Safety device 10 also includes stem 30. Stop 13 and stem 30 combine to define a valve internal to safety device 10. Stem 30 includes seat washer 17, lower retainer 18, upper retainer 19, connecting member 20 and washer 23. Distal end 21 of connecting member 20 can include a nut 22 to secure washer 23. A diameter of washer 23 is greater than a diameter of the hole defined by stop 13, which in a first position allows stem 30 to hang vertically and loosely from stop 13. Connecting member 20 connects washer 23 to upper retainer 19, washer 17 and lower retainer 18. Upper and lower retainers 18, 19 sandwich washer 17 in place. The design of upper retainer 19, washer 17 and lower retainer 18 are such that when in a second position shown in FIG. 5, upper retainer 19 passes into the hole defined by stop 13, and washer 17 is forced against seat 15 by lower retainer 18 by an upward force Ff of fluid 40. Although illustrated as separate components, it is contemplated that all or parts of stem 30 can be monolithically formed as one piece. It is also contemplated that safety device 10 and all or parts of stem 30 can be made of the same or different materials, which can include, for example, copper, brass, or polyvinyl chloride (PVC). The choice of materials will depend, at least in part, on the environmental conditions and the fluid being stored in the tank.

Safety device system shown in FIGS. 6-9 includes tank 50. Tank 50 includes fluid inlet port 51, air vent port 52 and fluid outlet port 53. Fluid 40 is filled into tank 50 through inlet port 51 via nozzle 41 and hose 42. Hose 42 can be attached to a fluid pump truck (not shown) that pumps fluid 40 into tank 50. Fluid 40 is removed from tank 50 via outlet port 53. Safety device 10 is attached to tank 50 at air vent port 52 and permits air to enter or exit tank 50 as needed to maintain equilibrium between a pressure in tank 50 and atmospheric pressure outside of tank 50.

During a normal fluid consumption operation, as fluid is removed from a tank 50, air is drawn into second end 12, through the hole defined by stop 13, passed stem 30, out from first end 11 and into tank 50. See, FIG. 3. The arrows throughout the drawings indicate the airflow direction. This process permits the pressure in tank 50 to equalize with the atmospheric pressure outside of tank 50. To further facilitate airflow, washer 23 can define one or more holes therein.

Figure 10:
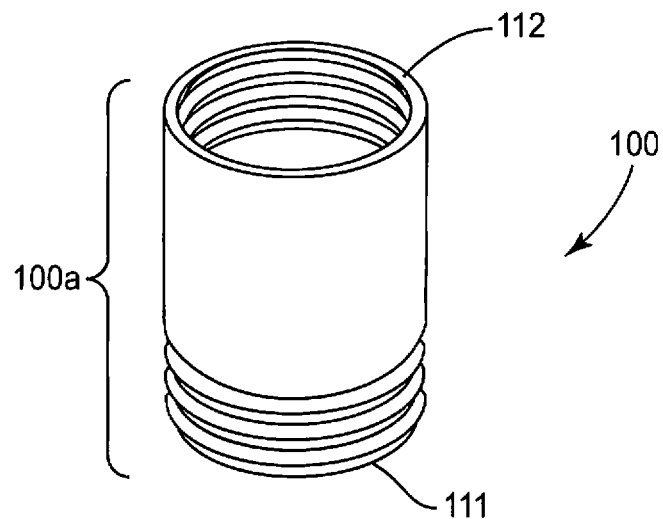
FIG. 10 is a perspective view of a fill alarm of a safety device in accordance with the principles of the present disclosure.
Figure 11:
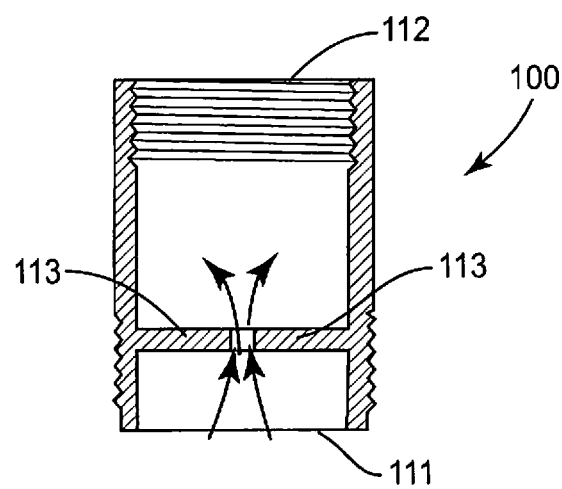
FIG. 11 is a cross sectional view of a fill alarm of a safety device illustrated in FIG. 10.
Figure 12:
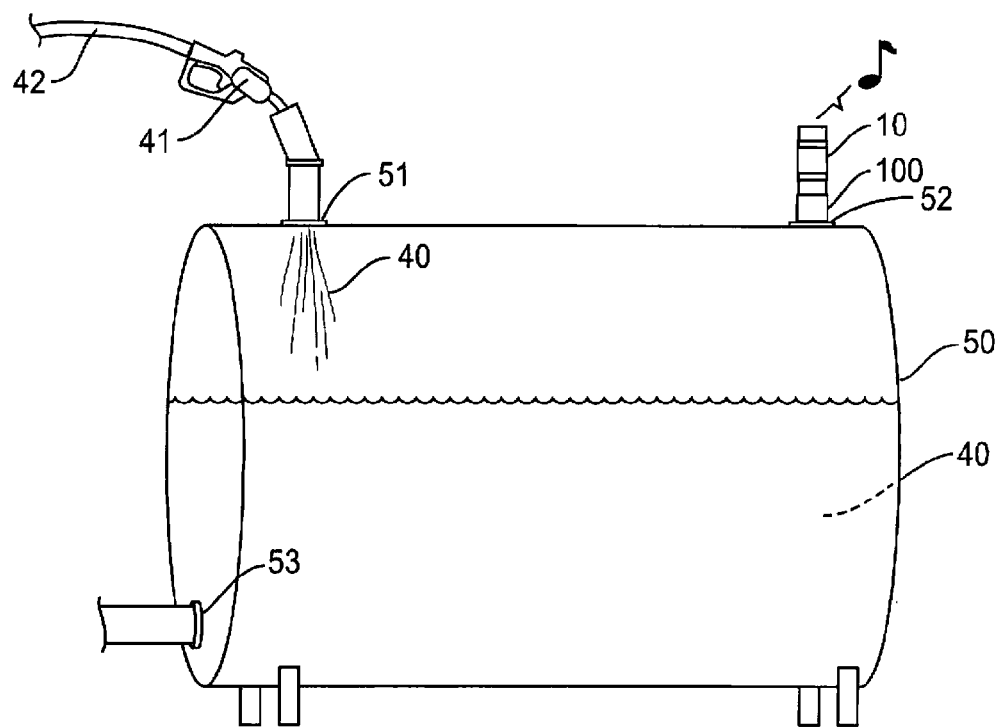
FIG. 12 a partial cross sectional perspective view of one particular embodiment of a safety device system including a fill alarm in accordance with the principles of the present disclosure.
Figure 13:
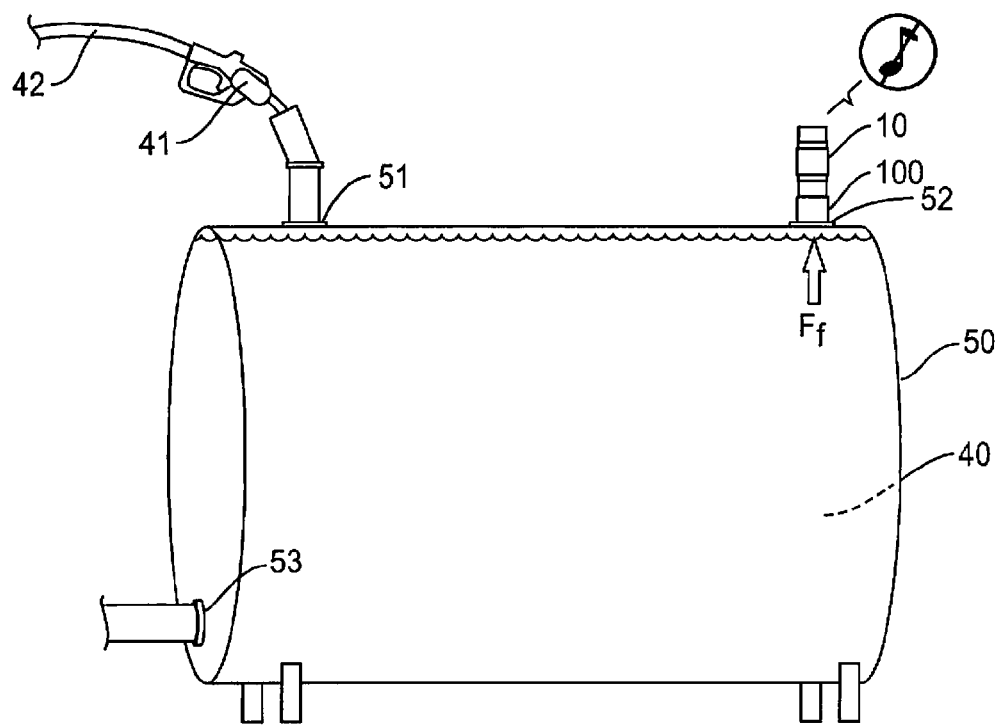
FIG. 13 is a partial cross sectional view of the safety device system illustrated in FIG. 12 at a fluid shut off state.

During a fluid filling operation as shown in FIGS. 4-9, fluid 40 is pumped into tank 50 via nozzle 41. As fluid 41 enters tank 50, the air pressure increases inside tank 50. This increase in air pressure forces air out of tank 50 through safety device 10 to the outside of tank 50, maintaining pressure equilibrium. See, FIG. 6. During this process, air is forced into safety device 10 through first end 11, around and passed stem 30, through the hole defined by stop 13 and out second end 12. See, FIGS. 4 and 10. As can be seen, the weight of or gravitational forces on stem 30 will affect the operation of the safety device. Stem 30 must be heavy enough to remain in the first position (See, FIG. 4) during the filling process such that the force of the airflow through safety device 10 does not force stem 13 to the second position (See, FIG. 5).

The filling process continues until fluid 40 fills tank 50 at which point fluid will begin to exit tank 50 through air vent port 52. At this point fluid 40 continues to exit tank 50 and begins to enter into safety device 10 filling the space defined below stop 13. As fluid 40 continues to fill in the space, force Ff of fluid 40 will force stem 30 upward. Stem 30 will continue to be forced upward until washer 17 seals on seat 15, thus preventing any of fluid 40 from exiting from second end 12 and preventing a spillage of fluid 40 outside of tank 50. Again, the weight of stem 30 will affect the operation of the safety device. Stem 30 must be light enough to be forced from the first position (See, FIG. 4) during the filling process such that force of the fluid Ff moves stem 13 from the first position to the second position (See, FIG. 5). Changes in the force of the airflow and the force Ff of fluid 40 will change the weight requirements of stem 30.

It is contemplated that a flow reducer 25 defining an orifice can be positioned between first end 11 and stem 30. Flow reducer 25 is used to reduce the flow of air and fluid that enters safety device 10. In a preferred embodiment, flow reducer 25 reduces the flow of fluid into safety device 10 such that the fluid force required to move stem 30 from the first position to the second position is produced by a fluid flow into first port 51 of approximately one gallon per second. In order to maintain proper operation during the consumption and filling operations, the characteristics (e.g. weight and/or density) of stem 30 will need to be varied with the size of the orifice in flow reducer 25.

As can be understood, a sudden stopping of fluid 40 through safety device 10 will quickly cause a pressure increase inside tank 50 and into nozzle 41 and hose 42. In order to prevent the pressure from increasing passed a preset level, a pressure switch (not shown) can be installed in the fluid path that can sense the increase in pressure and shut off the pump supplying fluid 40.

In another embodiment of the present invention, safety device system includes a fill alarm used in connection with safety device 10. Turning now to FIGS. 10-13, there is illustrated components of a safety device system including safety device 10 and fill alarm 100 in accordance with the principles of the present disclosure.

Fill alarm 100 is a whistle-type fill alarm wherein as air flows through fill alarm 100 a whistle sound is created. Fill alarm 100 includes a body 100a, a first open end 111 and a second open end 112. Body 100a includes a ring shaped whistle stop 113 that extends inward and along an inside circumference of body 100a. Whistle stop 113 defines a hole therein. Body 100a can include male or female threads at ends 111, 112 to facilitate connection between fill alarm 100 and other components, for example, safety device 10. Other means for connection are contemplated, for example, compression fittings, clamps, or adhesive fittings. Other fill alarms are contemplated.

In a preferred embodiment, fill alarm 100 is connected to port 52 and safety device 10 is connected to fill alarm 100 such that fill alarm 100 is positioned between safety device 10 and tank 50. The positioning of fill alarm 100 between tank 50 and safety device 10 is used to reduce the flow of air and fluid through safety device 10. In this configuration, flow reducer 25 may be eliminated as whistle stop 113 can act as a flow reducer; both can be used. The reduction in the flow of air and fluid must be factored into the design of the safety device 10, and more particularly in the weight and/or density of stem 30. In this preferred embodiment, a fuel oil flow of approximately 1 gallon per second into the tank is sufficient to seal washer 17 onto seat 15 of a stem 30 made from brass. Once safety device 10 is in the second and closed position, whistle-type fill alarm 100 will cease to produce its whistle sound as neither air nor fluid can pass through whistle stop 113.

In another embodiment of the present invention, a method for preventing fluid spillage from a storage tank is disclosed. As above, tank 50 includes a first port for filling the tank with fluid and a second port for allowing airflow therethrough. The method includes providing a fill alarm, attaching the fill alarm to the second port, providing a flow check valve, and attaching the flow check valve to the fill alarm. In addition, it is noted that the flow check valve is designed to remain in an open position during a consumption and filling operation to permit airflow therethrough and remain in a closed position during a filling operation when fluid flows into the flow check valve.

Although safety device has been illustrated as having a stem in the examples given above, other types of valves are contemplated. For example, a flapper-type check valve is also contemplated. When using a flapper-type check valve, the weight of the flapper is designed to remain open during filling airflow but will close when fluid is forced through the check valve.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A storage tank safety system, comprising:
    a storage tank configured to store a fluid having a first port used to fill the tank with the fluid and a second port used as an air vent; and
    a safety device connected at the second port configured to permit air to vent and configured to prevent the fluid from flowing through the second port,
    wherein said safety device comprises:
    a stop positioned centrally between a first open end and a second open end of the safety device and extending inward from an outer edge of said body and along a circumference of said body, said stop defining a hole located centrally therethrough; and
    a stem positionable between a first position within said hole to allow airflow in two directions through said hole and a second position to prevent fluid flow in a direction out of said tank through said hole,
    wherein a weight of the stem is determined to permit the air to flow through the safety device and prevent the fluid from flowing through the safety device.

2. The storage tank safety system of claim 1, wherein the fluid is fuel oil.

3. The storage tank safety system of claim 1, wherein the safety device is a flow check valve and the flow check valve is one of a stem-type check valve and a flapper-type check valve.

4. The storage tank safety system of claim 1, further comprising a fill alarm positioned between the second port and the safety device.

5. The storage tank safety system of claim 4, wherein the fill alarm is a whistle-type fill alarm.

6. The storage tank safety system of claim 5, wherein said whistle-type fill alarm reduces the flow of the air and fluid into the safety device.

7. The storage tank safety system of claim 6, wherein the stem is configured to operate in the first and second positions based on the reduction of the flow of the air and the fluid produced by the fill alarm.

8. The storage tank safety system of claim 7, wherein the fluid force required to move the stem from the first position to the second position is produced by a fluid flow into the first port of approximately one gallon per second.

9. The storage tank safety system of claim 1, wherein the safety device further comprises a flow reducer positioned between the second port and the stem to reduce the flow of the air and fluid through the safety device, and wherein the stem is configured to operate in the first and second positions based on the reduction of the flow of the air and the fluid produced by the flow reducer.

10. A safety device for a fuel oil storage tank having a first port for filling the tank with fuel oil and a second port for allowing airflow therethrough, the safety device comprising:
    a tubular body having a first open end and a second open end connectable to the second port; and
    a flow check valve contained within the tubular body and configured to remain open when air flows through the safety device and configured to close based on a predetermined fluid force of the fuel oil through the safety device,
    wherein said flow check valve comprises:
    a stop positioned centrally between said first and second open ends and extending inward from an outer edge of said body and along a circumference of said body, said stop defining a hole located centrally therethrough; and a stem positionable between a first position within said hole to allow airflow through said hole and a second position to prevent fluid flow through said hole, wherein the weight of the stem is determined to permit the air to flow through the safety device and prevent the fuel oil from flowing through the safety device.

11. The safety device of claim 10, wherein the predetermined fluid force is produced by a fuel oil flow into the first port.

12. The safety device of claim 10, further comprising a flow reducer positioned between the second port and the flow check valve to reduce the flow of the air and fluid through the safety device.

13. The safety device of claim 12, wherein the stem is configured to operate in the first and second positions based on the reduction of the flow of the air and the fluid produced by the flow reducer.

14. The safety device of claim 13, wherein the fluid force required to move the stem from the first position to the second position is produced by a fluid flow into the first port of approximately one gallon per second.

15. The safety device of claim 12, wherein the flow reduction orifice is a whistle-type fill alarm.

* * * * *